J. P. WHITLOW.
PROCESS FOR PRESERVING EGGS.

No. 176,720. Patented April 25, 1876.

Witnesses
John Becker
Fred Hames

J. P. Whitlow
by his Attorneys
Brown & Allen

UNITED STATES PATENT OFFICE.

JOHN P. WHITLOW, OF TAMAROA, ILLINOIS.

IMPROVEMENT IN PROCESSES FOR PRESERVING EGGS.

Specification forming part of Letters Patent No. 176,720, dated April 25, 1876; application filed March 6, 1876.

*To all whom it may concern:*

Be it known that I, JOHN P. WHITLOW, of Tamaroa, in the county of Perry and State of Illinois, have invented a novel Process for Preserving Eggs; and I do hereby declare that the following is a full, clear, and exact description of the same, reference being had to the accompanying drawing, which forms part of this specification.

My invention consists in the employment of suitable quantities of certain salts, known as saltpeter, or nitrate of potash, and sal-ammoniac, or muriate of ammonia, both salts being sprinkled in a pulverized state upon layers of, or distributed among, fibrous, glumaceous, or granular materials, in which the eggs are packed, the whole being inclosed in air-tight receptacles.

Figure 1:
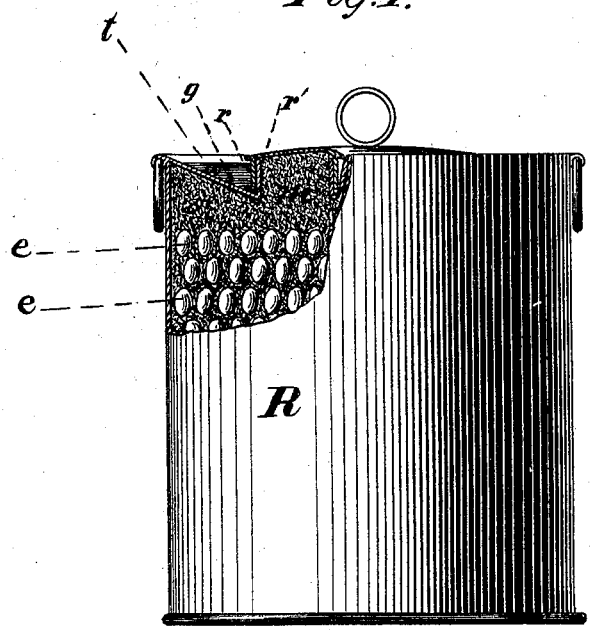
Figure 2:
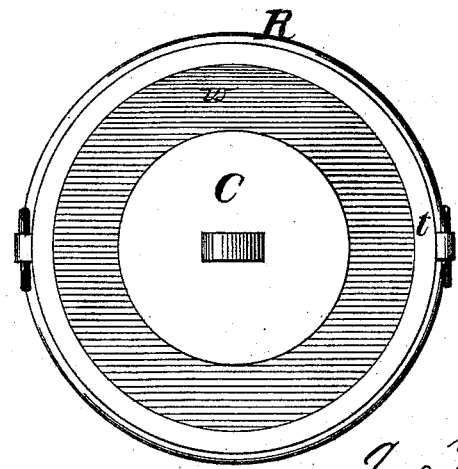

Figure 1 in the accompanying drawing represents a side view of an air-tight receptacle, with eggs packed therein according to my improved process, a portion of the side of the same being broken away to show the interior, and the method preferred for hermetically sealing the same. Fig. 2 is a top view of the receptacle when closed and sealed.

R is the receptacle, preferably made of tinned plates. C is the cover of the said receptacle. The top $t$ of the receptacle R is, preferably, made annular in form, and has formed in its upper side a groove or gutter, $g$, into which the rim $r$ of the cover C penetrates, and the inner rim $r'$ of which the rim $r$ of the cover fits when the said cover is placed in position to close the receptacle R, as shown in Fig. 1. When the eggs $e$ are packed in the receptacle R, as shown in Fig. 1, the cover C is placed in position to close the receptacle, and the gutter $g$ is filled with melted resin, $w$, or some other material which will hermetically seal the receptacle.

In packing the eggs, I first place upon the bottom of the receptacle a layer of cotton, tow, oats, chaff, or other suitable fibrous, granular, or glumaceous material, $m$, and upon this I sprinkle pulverized saltpeter and pulverized muriate of ammonia, in the proportion of one-half ($\frac{1}{2}$) ounce of each of said salts to every dozen of eggs packed. I thus proceed to pack in alternate layers of packing and of eggs, distributing the salts throughout the package, as aforesaid, till I cannot conveniently put any more eggs in the receptacle, and I then stuff the unfilled space with the packing material $m$. The receptacle is then hermetically closed, as above described; but, instead of sprinkling the salt upon the layers, the said salts may be mixed with the said packing material before packing the same in layers. The eggs are thus protected from mechanical injury, and are surrounded by non-conducting materials, which protect them from changes of temperature. Only a very small percentage of dry air remains in the receptacle. The salts employed exert a cooling and preservative action upon the eggs, thus rendering all the conditions very favorable for the preservation of the eggs. All the attention necessary, after the eggs are packed, will be to turn the receptacle about every seven days, so that the end which has previously stood at the bottom shall stand at the top, in order to keep the yolks of the eggs from gravitating to the under sides of the shells.

While the stated proportional weights of the salts per dozen eggs is found by experiment to be a proper and sufficient quantity, I do not confine myself strictly to the quantities named.

I have found by experiment that eggs packed according to the method described will keep for long periods in an excellent condition.

I am aware that animal substances have been treated with salts known as sulphites and nitrates, in which the meat is dipped, and such I disclaim.

I claim—

The process of preserving eggs by packing them between layers of fibrous, granular, or glumaceous materials, with pulverized nitrate of potash and pulverized muriate of ammonia, in a hermetically-sealed receptacle, substantially as and for the purpose herein set forth.

J. P. WHITLOW.

Witnesses:
C. C. JEWELL,
D. C. BARBER, Jr.